2,824,387

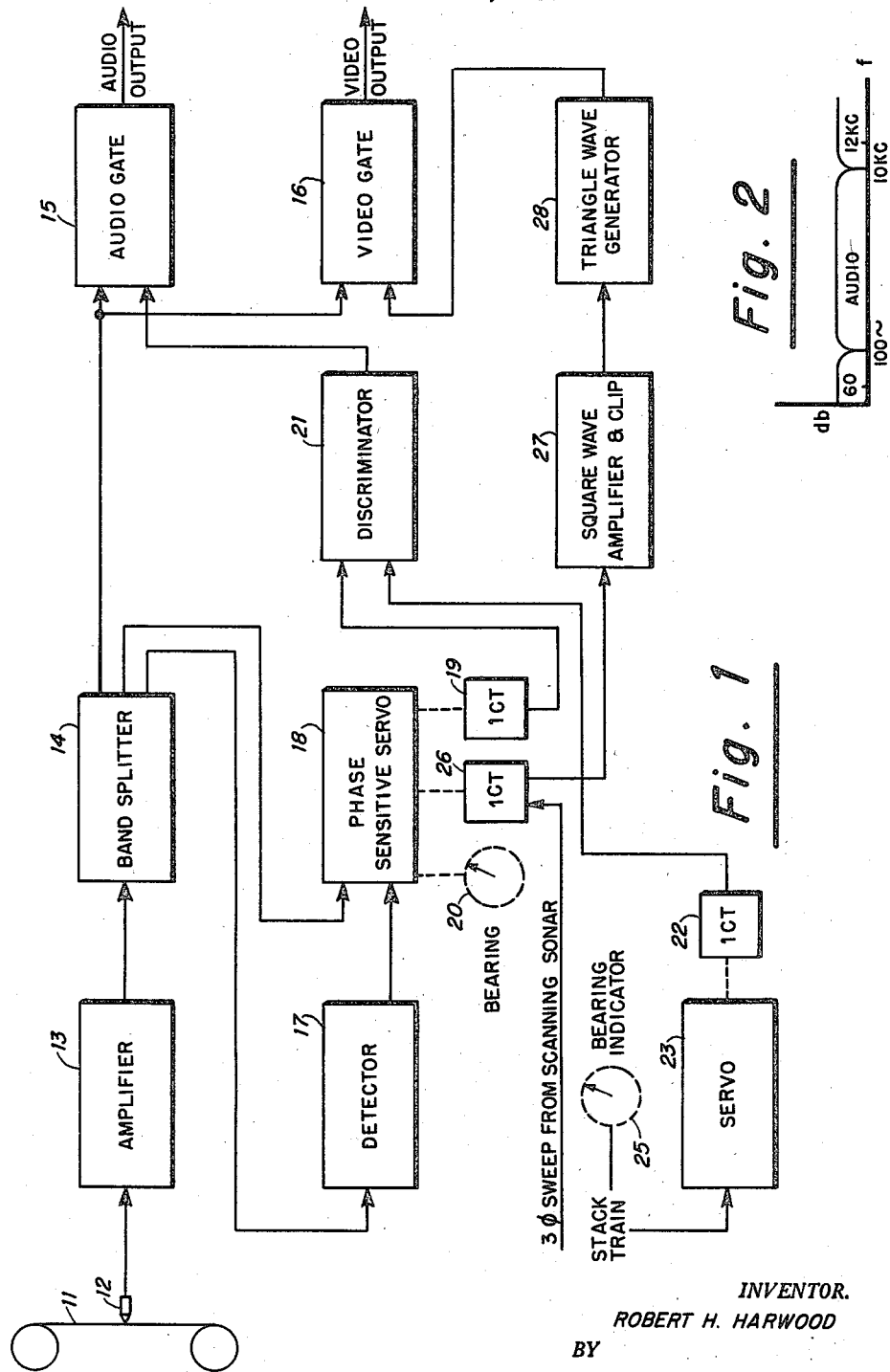

SONAR SIMULATOR

Robert H. Harwood, San Diego, Calif., assignor to the United States of America as represented by the Secretary of the Navy Application December 3, 1954, Serial No. 473,061

4 Claims. (Cl. 35—10.4)

(Granted under Title 35, U. S. Code (1952), sec. 266)

The invention described herein may be manufactured and used by or for the Government of the United States of America for governmental purposes without the payment of any royalties thereon or therefor.

This is a continuation-in-part of application Serial No. 375,578, filed August 20, 1953, now Patent No. 2,775,828.

This invention relates to simulators and more particularly to a sonar trainer having an audio and video output.

Heretofore the only way that shipboard training could be given was by use of another ship as a target. However, this was expensive, time consuming and could be used only when in an area where other ships were available.

The apparatus of the present invention makes use of magnetically recorded audio and control (bearing) information previously recorded at convenient and opportune times. This mechanism employs a small playback device with associated circuitry to give bearing information in both audio and video presentation as well as the audio spectrum associated with different types of targets. Only this small unit and the magnetic tapes containing the previously recorded information need be used aboard ship, providing a highly portable, inexpensive and simple trainer for training sonar operators. It also may be used in training operators on shore.

It is an object of this invention to provide a sonar simulator utilizing recorded bearing and range information.

Another object is the provision of realistically simulated audio signals such as are detected by sonar gear under actual operating conditions.

A further object is the provision of audio and video means for presenting bearing information of targets while presenting audio target information.

Other objects and many of the attendant advantages of this invention will be readily appreciated as the same becomes better understood by reference to the following detailed description when considered in connection with the accompanying drawings wherein:

Fig. 1 is a block diagram illustrating the invention; and

Fig. 2 is a graphic illustration of the various frequency bands utilized in the present embodiment of the invention.

Referring now to the drawing, a recording medium such as magnetic tape 11 has a plurality of signals recorded thereon. Preferably these signals are recorded on the tape 11 by suitable recording mechanisms in conjunction with a sonar system under actual operating conditions. In the illustrated embodiment the tape has three signals each in different frequency bands recorded thereon, one being a 60 C. P. S. reference sine wave, a second signal being a 60 C. P. S. sine wave modulated onto a 12 kc. carrier with a phase shifted from the reference wave in an amount proportional to the bearing of a target from a reference direction, and a third signal being in the audio band of 100 C. P. S. to 10 kc. All three of these signals are recorded simultaneously on the tape during the operation of the sonar gear and, since they are each in different frequency bands, may all be transcribed or reproduced with one transducer 12 in the reproducing system.

In recording, the reference signal is unvaried as it is fed into the tape recording transducer during operation of the sonar gear. The phase shifted sine wave, however, is phase shifted by suitable means such as a synchrotransformer responsive to movement of the bearing mechanism or directional transducer of the sonar gear. Thus the phase shift of this 60 C. P. S. sine wave is a function of the bearing angle of the sonar transducer at any particular instant of recording. The audio signal may be recorded directly from the audio output circuit of the sonar gear and thus is a true reproduction of the audio signal which would be heard by one operating the sonar gear.

The system illustrated in Fig. 1 utilizes this recorded information to simulate the actual conditions experienced by the sonar operator at the time the signals were recorded. The magnetic tape 11 having signals recorded thereon is fed past a suitable transducer 12 which picks up the signals and feeds them to a broad band amplifier 13. The amplified signals are then fed into a suitable band splitter or filter circuit 14 which separates the three signals. This filter may be of any conventional design suitable for the purpose and preferably comprises three separate filters: a low pass filter for passing the 60 C. P. S. reference sine wave, a band pass filter for passing the audio band of 100 C. P. S. to 10 kc., and a high pass filter for passing the 60 C. P. S. sine wave modulated 12 kc. carrier. The output from amplifier 13 is applied in parallel to these three filters, and the three outputs therefrom, namely, the low pass, band pass, and high pass outputs are applied respectively to the circuit elements 18, 15, and 17.

The audio signal is fed directly from the output of the band splitter 14 to the input of audio gate 15 and video gate 16. Gates 15 and 16 may be of any conventional design suitable for the purpose and each preferably is of the dual tube or multiple grid tube types disclosed, for example, on pages 378, 329 of the Massachusetts Institute of Technology Radiation Laboratory Series, Volume 19, Waveforms, McGraw-Hill, first edition, 1949. In the case of the dual tubes, for example, a pair of triodes are connected as parallel cathode followers having a common cathode load resistor. A bias control signal is applied to the grid of one of the cathode follower tubes and the audio signal is applied to the other. The cathode bias applied to the grid of the second cathode follower tube, however, renders the same unresponsive to the signal applied to the grid until the bias control signal applied to the grid of the first tube is reduced. When this happens, the signal appears across the cathode load resistor. Removal or reduction of the bias control signal permits the audio signal to pass to or appear in the output of this cathode follower circuit and, hence, the same is referred to as a gate. The band splitter passes the 60 C. P. S. modulated phase shifted wave to a detector 17, while the 60 C. P. S. reference wave is passed to the phase sensitive servo 18. The detector then passes the phase shifted wave to the servo where it is compared with the reference wave and turns the rotor in syncro transformer 19 to impress a wave of a certain phase on discriminator 21.

The phase sensitive servo 18 may be any suitable mechanism which is capable of adjusting the rotational position of an output shaft to an angular position corresponding to the difference in phase between two signals. Such a servo, for example, may be generally similar to the servo system disclosed on pages 350–353 of Radar System Fundamentals NAVSHIPS 900,017, April 1944. In this system an error voltage, comparable to the phase shifted 60 C. P. S. signal of the instant invention, is generated when a control handwheel on a selsyn generator is adjusted to move an antenna to a desired position. The error signal is shifted in phase relative to a 60 C. P. S. reference voltage in an amount corresponding to the angular difference between the actual position of the antenna and its desired position. The error voltage is fed to a bias amplifier which varies the impedance in series with a two phase A.-C. motor to control the speed thereof. The motor shaft adjusts the position of the antenna and the rotor of a selsyn control transformer whose stator field is energized by the selsyn generator, thus completing the servo loop. The error voltage is also fed to a direction amplifier (phase discriminator generally similar to discriminator 21 of the instant invention) where its phase is compared with the phase of the reference voltage in order to control the direction of rotation of the motor. When the signals are in phase, bias is removed from a tube of the direction amplifier such that the plate current drawn by the tube operates a relay which has transfer contacts to switch a phase splitting capacitor between a pair of stator windings of the motor thus operate to control the direction of rotation of the motor output shaft. In the present invention the output shaft drives the bearing indicator 20 and the rotors of the control transformers 19 and 26.

Discriminator 21 may also be generally similar to the phase sensitive detector, Fig. 12.21, disclosed on page 446 of the aforementioned Radiation Laboratory Series, volume 19, Waveforms. The D.-C. output of this detector provides the bias for controlling audio gate 15. Transformers 19 and 22 are energized from a three phase 60 C. P. S. source, not shown, in a manner well-known to those skilled in the art. Transformer 26 is energized by a scanning sonar equipment as will be hereinafter explained. The rotor of syncro transformer 22 is suitably connected through servo 23 for angular movement under control of the training control system of a scanning sonar equipment such, for example, as Scanning Sonar Equipment Navy Model QHB–a. Such an equipment is described in Instruction Book NAVSHIPS 91125 and comprises a multi-element projector-receiver transducer which transmits signals in all directions. As soon as the "ping" leaves the transducer, it is transferred to receiving condition and the echo signals received thereby are applied to video and audio scanning switches in parallel.

The video scanning switch rotates constantly, sampling all signals at all bearings. The signal from the video channel is applied to the control grid of a cathode ray tube (CRT) indicator where it serves as a brightening voltage. The 3φ sweep in the CRT is synchronized with the rotation of the video scanning switch so that brightening occurs at the correct target bearing. A spiral sweep is used so that both range and bearing of targets can be observed.

The audio scanning switch is positioned to any desired bearing by the training control system under control of the operator who manipulates a handwheel. A sharp beam pattern of signals results along the selected bearing and these signals go to the audio channel of the receiver, the output from which feeds a speaker.

The handwheel moves a bearing indicator 25 and in the instant invention also causes a corresponding angular movement of the rotor in the syncro transformer 22, which is connected to discriminator 21. The rotor of syncro transformer 22 is originally set so that when it is turned by the handwheel to the bearing on which the information was recorded, and indicated by bearing indicator 20 operated by servo 18, the phase of the 60 C. P. S. from the output of transformer 22 matches the phase of the recorded phase shifted 60 C. P. S. signal from the output of transformer 19. When the phases of these two signals are in coincidence, the output of the discriminator 21 will be a null. At other than in-phase relation, the discriminator 21 has an output voltage proportional to such phase difference.

The output of the discriminator 21 is connected in bias relation to audio gate 15. It will thus be seen that when the student controlled bearing indicator 25 is turned to the bearing at which the information was recorded, the phase of the rotor of transformer 22 matches the phase of the rotor of transformer 19, and thus the phase of the recorded wave which the rotor of 19 follows by action of servo 18 and the bias produced by discriminator 21 will be a null. The audio gate 15 thus permits the audio signal from band splitter 14 to pass through to a suitable audio output, not shown. When the bearing indicator 25 is trained off the original bearing at which the recording was made, the output bias of the discriminator will bias the audio gate proportionately decreasing the audio output to the point where no signal will be audible.

It should be noted that the audio signal from band splitter 14 is also connected to video gate 16. The three-phase sweep from the aforementioned scanning sonar equipment, is fed to the stator leads of syncro transformer 26, whose rotor is controlled by the phase sensitive servo 18. A rotating field is thus set up in the stator of transformer 26 which rotates synchronously with the spiral scan of the CRT indicator aforedescribed and induces a sine wave in the rotor. The shaft output of phase sensitive servo 18 has a rotational position indicative of the bearing at which the recorded audio signals are received from the audio scanning switch, the recorded phase shifted signal being shifted in phase in accordance with the bearing of the audio scanning switch of the aforedescribed scanning sonar gear, for example. Since the rotor of transformer 26 is positioned by the output shaft of phase sensitive servo 18, the sine wave induced in the rotor is thus kept in phase with the bearing of the recorded signals. This wave travels through the transformer rotor leads to square wave amplifier and clipper 27, thence to triangular wave generator 28. Reference may be had to the aforementioned Radiation Laboratory Series, volume 19, Waveforms, for circuit details of waveform generators, particularly section 8.2, pages 290, 291, 292, and 293, dealing with triangular waves. Having been squared, clipped, and made into a triangular wave, it is now fed as a bias into the video gate 16. Here it opens the gate to allow the audio signal to pass through to form the characteristic wedge form of a target on a spiral scan indicator at the bearing of the signal on the recorded tape 11.

The apparatus of this invention may be used with listening gear only, in which case it operates in an improved manner similar to that disclosed in my co-pending application. This apparatus may further be used with scanning sonar gear having both audio and video presentation.

Obviously many modifications and variations of the present invention are possible in the light of the above teachings. It is therefore to be understood that within the scope of the appended claims the invention may be practiced otherwise than as specifically described.

What is claimed is:

1. A sonar trainer comprising a record medium having three simultaneous superimposed signals recorded thereon, means for reproducing and separating said signals, said means having three outputs, one for each of said signals, an audio gate and a video gate, one of said three outputs being connected to said audio gate and to said video gate, a phase sensitive servo, the other two of said outputs being connected to said servo, a syncro transformer connected to said servo and having a rotor responsive to the phases of the two signals at said servo, a phase discriminator, the output of said syncro transformer being connected to a first input into said discriminator, a phase shiftable signal generating means, means for selectively causing said generating means to shift the phase of its output signal, the output of said signal generating means being connected to a second input into said discriminator, the output of said discriminator being connected in biasing relation to said audio gate.

2. The apparatus defined as in claim 1, a second syncro transformer connected to said servo and having a rotor responsive to the phases of the two signals at said servo, the input of said second transformer being connected to the sweep output of a scanning sonar, the output of said second transformer being connected to wave-shaping circuits for shaping the wave output into a waveform suitable for triggering said video gate, the output of said wave shaping circuits being connected in biasing relation to said video gate.

3. A sonar trainer comprising a recording medium having three simultaneous wave forms recorded thereon, said wave forms being a reference wave, a second wave phase shifted proportional to bearing information, and a third wave representing object identification information, means for reproducing said wave forms, means for separating said wave forms one from the other, said separating means having three outputs one for each of said wave forms, audio gate means and video gate means connected to said third wave form output, bearing training means having bearing indicating means associated therewith, phase sensitive servo means having an input operably connected to the reference wave output of said separating means and proportional to said reference wave, said servo means having a second input operably connected to the second wave output of said separating means and proportional to said second wave, a first syncro transformer operatively connected to said servo, the phase angle of the rotor in said transformer being directly proportional to the phase angle between said reference wave and said second wave, means for comparing the phase angle of the output of said first syncro transformer with the phase angle of the output of said bearing training means, the output of said comparing means being proportional to the phase difference in said first syncro transformer output and said bearing training means output and being connected in biasing relation to said audio gate means, whereby said audio gate is open only when said difference in phase angles is substantially zero, a second syncro transformer operatively connected to said phase sensitive servo and having an output phase corresponding to the output phase of said first syncro transformer, wave shaping means connecting said second syncro transformer output in biasing relation with said video gate.

4. A sonar simulator system comprising a recording medium having a bearing signal, a reference signal and an audio signal, each in separate frequency bands, recorded in simultaneous relation thereon, means for reproducing said signals, means for separating said signals each from the other, said separating means having three outputs one for each of said signals, an audio gate and a video gate, the audio signal output of said separating means being applied to the input of each of said gates, means for comparing said bearing signal with said reference signal, said comparing means being connected to an audio gate biasing means, bearing training means connected to said audio gate biasing means, the output of said biasing means being proportional to the phase difference between the output of said bearing training means and said comparing means, whereby said audio gate is open only when said phase difference is substantially zero, and a wave shaping circuit connecting said comparing means with said video gate.

References Cited in the file of this patent

UNITED STATES PATENTS

| | | |
|---|---|---|
| 2,375,004 | Knowles | May 1, 1945 |
| 2,459,679 | Beyer et al. | Jan. 18, 1949 |
| 2,471,315 | Dehmel | May 24, 1949 |
| 2,559,039 | Decker | July 3, 1951 |
| 2,652,636 | Garman et al. | Sept. 22, 1953 |
| 2,713,729 | Springer | July 26, 1955 |